United States Patent [19]

Haraikawa

[11] 3,999,807

[45] Dec. 28, 1976

[54] DUAL NETWORK HYDRAULIC BRAKE SYSTEM

[76] Inventor: Tetsuo Haraikawa, 5-44-26, Narashinodai, Funabashi, Chiba, Japan

[22] Filed: Sept. 9, 1975

[21] Appl. No.: 611,769

Related U.S. Application Data

[63] Continuation of Ser. No. 394,211, Sept. 4, 1973, abandoned, which is a continuation of Ser. No. 186,872, Oct. 6, 1971, abandoned.

[30] Foreign Application Priority Data

Oct. 6, 1970    Japan .......................... 45-87611

[52] U.S. Cl. .............................. 303/6 R; 60/535; 60/581; 188/345
[51] Int. Cl.² ....................................... B60T 11/20
[58] Field of Search ............ 188/1 A, 106 P, 345, 188/349; 303/6 R, 6 C; 60/534, 535, 581

[56] References Cited

UNITED STATES PATENTS

| 3,305,051 | 2/1967 | Maurice | 188/349 |
| 3,486,591 | 12/1969 | Scheffler | 188/345 X |

FOREIGN PATENTS OR APPLICATIONS

| 1,089,990 | 11/1967 | United Kingdom | 188/345 |

Primary Examiner—George E. A. Halvosa
Attorney, Agent, or Firm—Sughrue, Rothwell, Mion, Zinn & Macpeak

[57] ABSTRACT

A dual brake system is provided with a master cylinder unit, a pressure regulator valve unit and at least one wheel brake unit. Each unit has two hydraulically independent chambers therein and one chamber of each unit is connected with one chamber of each of the other units to define two independent hydraulic brake units. The ratio between the chamber of one unit to the chamber of the other unit in each unit is identical and is other than unity. An indicator or alarm is operatively connected to the pressure regulator valve unit.

1 Claim, 1 Drawing Figure

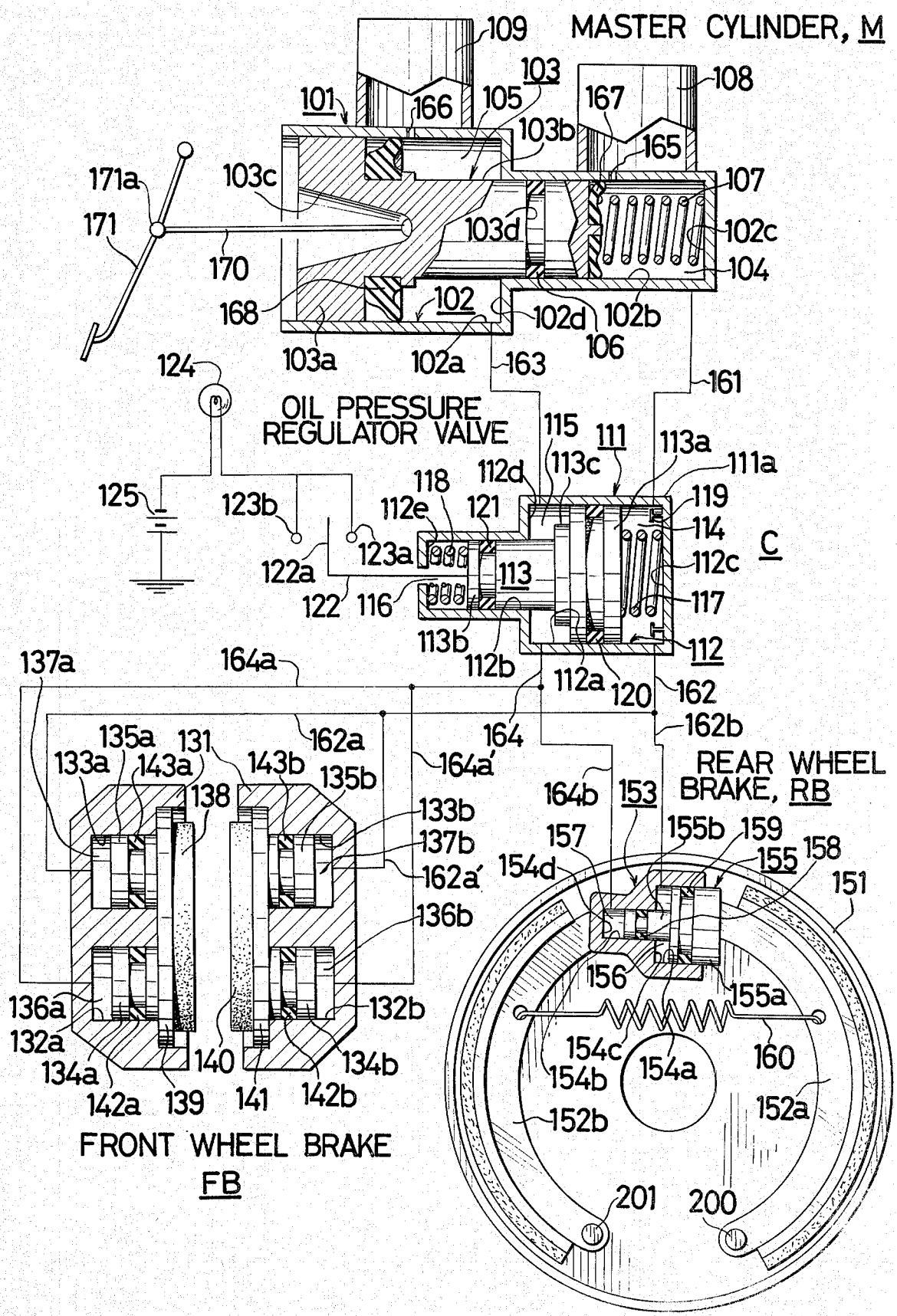

DUAL NETWORK HYDRAULIC BRAKE SYSTEM

This is a continuation of application Ser. No. 394,211, filed Sept. 4, 1973, now abandoned, which is a continuation of Ser. No. 186,872, filed Oct. 6, 1971, now abandoned.

This invention relates to improvements in and relating to a dual network hydraulic brake system for use with a powered and wheeled vehicle, especially automotive vehicle.

It is highly desirous in the dual network hydraulic brake system to maintain as possible a certain predetermined ratio between the practical hydraulic pressures prevailing in the dual component hydraulic systems. The reason is such that an appreciate variation in the pressure ratio, when brought about, the brake force distribution among the front and rear wheel pairs will be correspondingly altered which results in a substantial disadvantage as commonly known per se.

On the other hand, it is a sincere demand to detect and alarm a defect in the mutual hydraulic interruption between the both component systems, and/or in the maintenance of the prescribed pressurized conditions of the latter, necessary for assurance of the regular and independent operation of the dual brake component systems, caused by such as pipe rupture, sealing defects and/or the like.

The main object of the present invention is to provide an improved dual network hydraulic brake system capable of effectively compensating pressure deviations from the pressures necessary for practical maintenance of a predetermined ratio between the hydraulic component systems of the network, in an easy and automatic way, and of detecting an operational failure or extraordinary pressure deviation from the normal prevailing in either of the both component systems.

These and further objects, features and advantages of the invention will become more apparent as the description proceeds by reference to the accompanying drawing.

In the drawing:

The drawing is a schematic arrangement view of an embodiment of the dual network brake system shown in its substantially sectioned elevation.

Referring now to the accompanying drawing, a preferred embodiment of the invention will be described in detail.

In the sole drawing, M represents a hydraulic pressure supply source which is constructed into a tandem type master cylinder; C a hydraulic pressure regulator valve assembly; and FB and RB a front wheel- and a rear wheel brake unit, respectively, of an automative vehicle, not shown.

Numeral 101 denotes a main body of master cylinder M, which is formed with a stepped bore 102 passing axially therethrough and having a larger bore part 102a and a smaller bore part 102b. A stepped piston 103 having a larger piston part 103a and a smaller piston part 103b corresponding to said cylinder bore parts 102a and 102b, respectively, is slidably received in the bore 102.

A first hydraulic chamber 104 is provided at the right-hand part of the small cylinder bore element 102b and defined by and between the small piston part 103b and a small cylinder end wall 102c. A second and ring-shaped hydraulic chamber 105 is provided at the right-hand part of the large cylinder bore element 102a and defined by and between the large piston part 103a and a wall shoulder 102d forming a critical zone between the large and the small bore part 102a and 102b.

The master piston 103 is formed a cone-shaped axial recess 103c for receiving the inner end of a push rod 170, the outer end of the latter being linked at 171a with a conventional brake pedal, shown only schematically.

Small piston part 103b is formed with an intermediate ring groove 103d which receives a sealing ring 106 for preventing a hydraulic communication between the hydraulic chamber 104 and 105. A return spring 107 is provided under resilient compression between cylinder end wall 102c and the outer end of small piston part 103b.

A first hydraulic liquid reservoir 108 is fixedly mounted on the small cylinder part and contains therein a proper amount of oil, although not specifically shown for avoiding confusion. The oil space of reservoir 108 is kept normally as shown in fluid communication through communication opening 165 with the chamber 104 which is thus filled always with oil, although not shown.

A second hydraulic liquid reservoir 109 is mounted again rigidly on the large piston part of the main body 101 and contains therein a proper amount of oil, although not shown. The oil space of reservoir 109 is kept normally as shown in fluid communication through communication opening 166 with the chamber 105 which is therefore filled always with oil, although not shown for simplicity.

Sealing caps 167 and 168 are provided in sealing way upon the working or inner end surfaces of the small and large piston parts 103a and 103b, respectively.

When the driver of the automotive vehicle depresses brake pedal 171 as conventionally for the braking purpose, mechanical pressure is conveyed therefrom through push rod 170 to the hydraulic piston 103 which is thus urged to move in the right-hand direction, thereby the transmitted foot pressure being received in a divided manner by the oil contained within the both chambers 105 and 106, when these chambers are kept in their regular or ready-for-operating condition.

Should, however, one of these chambers, for instance 104, be in its ineffective condition, the transmitted foot pressure will be received by the oil contained in another effective one, such as 105 in this case.

Hydraulic pressure regulator C comprises a hollow main body 111 providing a stepped cylinder comprising a large cylinder part 112a and a small cylinder part 112b and receiving slidably a stepped valve piston 113 which has a large piston part 113a and a small piston part 113b. These piston parts 113a and 113b are slidable in a sealed way within respective cylinder parts 112a and 112b, respectively.

A first hydraulic chamber 114 is formed in the large cylinder part 112a and defined by the outer end of large valve piston part 113a and the end wall 112c of the valve cylinder 112. A second hydraulic chamber 115 is formed in the small cylinder part 112b and defined by and between the large valve piston part 113a and a shoulder 112d representing a critical zone between the large and small valve cylinder parts.

A spring chamber 116 is formed in the small valve cylinder part 112b and defined by and between the small valve piston part 113b and the smaller cylinder end wall 112c which is centrally and axially perforated. A pair of opposing springs 117 and 118 having a relatively weak force are provided within respective chambers 114 and 116 as shown, acting upon the valve piston 113 which is normally kept in its neutral position shown.

Stop means 119 are provided on the inside surface of valve cylinder end wall 112c for limiting the right-hand stroke of valve piston 113. As the stop means for limiting the left-hand stroke of valve piston 113 serves the stepped shoulder 112a of valve cylinder 11.

A first sealing ring 120 is mounted on large valve piston part 113a for providing an effective means adapted for interrupting fluid communication between the chambers 114 and 115. A second sealing ring 121 is mounted on small valve piston part 113b for providing an effective means adapted for interrupting fluid communication between hydraulic chamber 115 and spring chamber 116 which is kept always in pneumatic communication with ambient atmosphere.

To valve piston 113, more specifically the outer end of small valve piston part 113b, the inner end of switching bar 122 is fixedly attached, said bar extending outwardly through the perforated cylinder end wall 112e as clearly demonstrated. The opposite or outer end of the bar 122 is formed into a movable contact 122a which is adapted for making an electrical connection with either stationary contact 123a or 123b, depending upon the occasional position of the valve piston, thereby providing an electrical switching unit.

An alarm circuit includes said switching unit, an alarm, preferably an alarm lamp 124 and a current source 125 connected one after another in series as shown. The alarm lamp 124 is placed at a convenient place in the neighborhood of the drivers seat, not shown, preferably on a panel board of the vehicle, although not shown.

Front brake unit FB comprising a stationary caliper 131 only partially shown which straddles over a conventional brake disc, not shown, operatively connected with a related one of the vehicle wheels, not shown, for making unitary rotation with the wheel, as commonly known per se.

Two opposing pairs of brake piston-cylinder units comprising hydraulic brake cylinders 132a, 132b, 133a and 133b and pistons 134a, 134b, 135a and 135b, respectively. These brake pistons 134a, 134b, 135a and 135b mount fixedly respective sealing rings 142a, 142b, 143a and 143b. Hydraulic working chambers 136a and 136b formed in the cylinder bores 132a and 132b of the lower brake cylinder pair are hydraulically connected with each other by a piping 164a; 164a'. In the similar way, hydraulic working chambers 137a and 137b formed in the cylinder bores 133a and 133b of the upper brake cylinder pair are hydraulically connected with each other by a piping 162a; 162a'.

It should be noted that the cross-sectional area of the lower left hydraulic chamber 136a is selected to be equal to that of the lower right one at 136b. In the similar way, the cross-sectional area of the upper left hydraulic chamber 137a is selected to be equal to that of the upper right one at 137b.

The inwardly directing actuating ends of brake pistons 134a and 135a are fixedly attached by welding or the like conventional measure to one side of a supporting plate 139 which carries rigidly on its opposite surface a friction pad 138 by glueing, rivetting or the like measure, although not shown. In the similar way, the actuating ends of brake pistons 134b and 135b are fixedly attached to one side of a supporting plate 141 which carries a friction pad 140.

Although the front wheel brake unit FB is designed as the disc type as was referred to hereinabove, the rear wheel brake unit RB is designed as the shoe or drum type as shown, and comprises a stationary backing plate 151 on which a pair of brake shoes 152a and 152b are mounted pivotably. The brake cylinder unit is mounted on the backing plate 151, the said unit comprising a cylinder body 153 which is slidably mounted on the latter in the horizontal direction, although the slidable structure has been omitted from the drawing on account of its very popularity in the art. The cylinder body 153 is formed with a stepped bore comprising a small and a large bore part 154a; 154b, for receiving a stepped brake piston 155 comprising a large piston part 155a and a small piston part 155b slidably received in the large and small cylinder bore parts 154a and 154b, respectively.

A first and ring-shaped hydraulic chamber 156 is formed in the large cylinder bore part 154a and defined by and between large piston part 155a and a cylinder shoulder 154c at the critical zone between the large and small cylinder bore parts. A second hydraulic chamber 157 is formed in the small cylinder bore part 154b and defined by and between small piston part 155b and cylinder end wall 154d.

The outer end of large piston part 155a project through the open end of the large cylinder bore part and is linked as conventionally to the upper or motion-receiving end of the first brake shoe 152a, while the brake cylinder body 153 is operatively linked as conventionally with the upper and motion-receiving end of the second brake shoe 152b. Sealing ring 158 is fixedly mounted on the small piston part, for establishing effective interruption between the both hydraulic chambers 156 and 157. Further sealing ring 159 is fixedly mounted on the large piston part 155a and adapted for establishing an effective seal of the chamber 156 against the open atmosphere. A return spring 160 is bridged under tension between both brake shoes 152a and 152b.

By watching the connection mode of hydraulic pipings 161, 162, 162a, 162a', 162b, 163, 164, 164a, 164a' and 164b, it will be clearly understood that there are two hydraulically independent brake systems, including tandem type master cylinder M, hydraulic pressure regulator valve unit C, front wheel disc brake unit FB and rear wheel drum brake unit RB.

More specifically, a first hydraulic brake system to be called A, comprises hydraulic chamber 104 of the master cylinder M, hydraulic chamber 114 of unit C, hydraulic chambers 137a and 137b of brake unit FB, chambers 156 of brake unit RB and pipings 161, 162, 162a and 162b. A second hydraulic brake system, to be called B, comprises hydraulic chamber 105 of the master cylinder M, chamber 115 of unit C, chambers 136a and 136b of brake unit FB, chamber 157 of brake unit RB, and pipings 163, 164, 164a and 164b.

It should be mentioned that the corresponding hydraulic chambers in the both brake systems are designed not to have a common relative ratio 1 : 1 between the related cross-sectional areas, but in a specifically selected ratio, as will be mentioned hereinbelow.

Now assuming:

$A_m$ — effective cross-sectional area of chamber 104;
$B_m$ — that of chamber 105;
$A_c$ — effective cross-sectional area of chamber 114;
$B_c$ — that of chamber 115;

$A_f$ —effective cross-sectional area of either chamber 137a or 137b;
$B_f$ —that of either chamber 136a or 136b;
$A_r$ —that of chamber 156; and
$B_r$ —that of chamber 157.

Then, we will obtain the following relation:

$$A_m/B_m = A_c/B_c = A_f/B_f = A_r/B_r = k$$

k being not equal to unity.

The operational mode of the dual hydraulic brake system according to the invention so far shown and described is as follows:

When the driver depresses brake pedal 171, push rod 170 is advanced rightwards and master piston 103 is moved in the same direction, thus the hydraulic pressures being generated in hydraulic chambers 104 and 105 and discharged at a certain predetermined relative ratio from these chambers and through piping 161, chamber 114, piping 162, 162a, 162a', 162b to chambers 156, 133a and 133b; and through piping 163, 164, 164b, 164a, 164a' to chambers 157 and 136a, 136b, respectively.

In this way, brake pistons 134a, 134b, 135a and 135b are caused to actuate in the front wheel disc brake FB. Therefore, the two hydraulic brake systems A and B are energized in this brake unit.

In the case of rear wheel brake unit RB, brake piston 155 and brake cylinder 154 are hydraulically actuated in opposite directions, so as to exert braking effort onto the brake shoes 152a and 152b. In this brake unit RB, both hydraulic systems A and B are kept effective in their braking function.

Next, assuming that the foot pressure force upon the master piston 103 through actuation of the pedal 171 by the vehicle driver be expressed by F, and the hydraulic pressures generated in the both systems A and B be expressed respectively by $P_a$ and $P_b$, then:

When observing control valve unit C, $$P_a \cdot A_c = P_b \cdot B_c$$

thus, $$A_c/B_c = P_b/P_a = k,$$

$$P_a = P_b/k$$

$$P_b = k \cdot P_a$$

Therefore, it will be seen that the control valve unit C serves for maintaining the pressure ratio: $P_b/P_a$ between the hydraulic pressures prevailing in the both systems A and B at a certain constant valve k.

On the other hand, when observing the tandem type master cylinder M, the following relationship can be seen:

$$F = P_a \cdot A_m + P_b \cdot B_m = 2P_a \cdot A_m$$

thus, $$P_a = F/2A_m,$$

and $$P_b = kF/2A_m;$$

Therefore, under the regular operating conditions of the both systems A and B, the overall pressure force, to be expressed by $F_f$, exerted by brake pistons 134a, 134b, 135a and 135b upon the brake disc, not shown, in the brake unit FB, and the overall pressure force, to be expressed by $F_r$, exerted by brake piston 155 and brake cylinder 153 onto the respective brake shoes 152a and 152b, and their relative ratio will be:

$$\begin{aligned}
F_f &= P_a \cdot A_f + P_b \cdot B_f \\
&= F \cdot A_f/2A_m + (kF/2A_m)(A_f/k) \\
&= (F/A_m) \cdot A_f \\
F_r &= P_a \cdot A_r + P_b \cdot B_r \\
&= (F/2A_m)A_r + (kF/2A_m)(A_r/k) \\
&= (F/A_m)A_r \\
\text{then,} \quad F_f/F_r &= A_f/A_r
\end{aligned}$$

It is now assumed that one of the both hydraulic systems as B has become disable to operate by pipe burst or the like cause, while the other hydraulic system A is still effective to operate, then the overall pressure force $F'_f$ exerted by brake pistons 134a and 134b upon the brake disc in the unit FB and the overall pressure force $F'_r$ exerted by brake piston 155 and brake cylinder 153 of the unit RB upon brake shoes 152a and 152b, and the ratio between these pressure forces will be as follows:

In this case, the hydraulic pressure, to be denoted by $P'_a$, prevailing in the system A may be found from the following relationship:

$$\begin{aligned}
F &= P'_a \cdot A_m \\
\text{thus,} \quad P'_a &= F/A_m \\
\text{therefore,} \quad F'_f &= P'_a \cdot A_f \\
&= (F/A_m) A_f \\
&= F_f \\
F'_r &= P'_a \cdot A_r \\
&= (F/A_m) A_r \\
&= F_r \\
\text{therefore,} \quad F'_f/F'_r &= A_f/A_r = F_f/F_r
\end{aligned}$$

Or reversely, when the first system A should become disabled to operate and the brake action should be performed by reliance of the second system B, then the pressure force to be expressed by $F''_f$, and exerted by brake pistons 135a and 135b onto the brake disc in the unit FB, and that to be denoted by $F''_r$, and exerted by brake piston 155 and brake cylinder 153 upon brake shoes 152a and 152b in unit RB, and the relative ratio between these forces will be as follows. The oil pressure $P'_b$ prevailing in the system B will be:

$$\begin{aligned}
F &= P'_b \cdot B_m \\
\text{thus,} \quad P'_b &= F/B_m \\
&= kF/A_m \\
\text{and,} \quad P''_f &= P_b \cdot B_f \\
&= (kF/A_m)(A_f/k) \\
&= (F/A_m) A_f \\
&= F_f = F'_f \\
F''_r &= P'_b \cdot B_r \\
&= (kF/A_m)(A_r/k) \\
&= (F/A_m) A_r \\
&= F_r = F'_r \\
\text{Thus,} \quad F_f''/F_r'' &= A_f/A_r = \frac{F_f}{F_r} \\
&= F_f'/F_r'
\end{aligned}$$

As a last and most important example, it is assumed that both systems A and B have been brought unintentionally into fluid communication with each other, for instance, by breakage of any one or more of sealing means as at 106, 120 and 158, the overall pressure force, to be denoted $F'''_f$, and exerted by brake pistons 134a, 134b, 135a and 135b upon the brake disc in unit FB, and that, to be denoted $F'''_r$, and exerted by piston 155 and cylinder 153 upon respective brake shoes 152a and 152b in unit RB, and the relative ratio between these pressure forces will be as follows:

In this case, the hydraulic pressure $P''_a$ prevailing in the system A is equal to that in the system B.

Thus, $$F = P''_a (A_m + B_m)$$
therefore, $P''_a = F/(A_m + B_m)$
$$F'''_r = P''_a (A_f + B_f) = F(A_f + B_f)/(A_m + B_m)$$
$$= F[A_f(1 + 1/k)]/A_m (1 + 1/k)$$
$$= F \cdot A_f/A_m$$
$$= F_r = F'_r = F''_r$$
thus, $F'''_f/F'''_r = A_f/A_r = F_f/F_r$
$$= F'_f/F'_r = F''_f/F''_r$$

It can be thus ascertained from the foregoing that in the case of dual brake system according to this invention, the relationship between brake pressure transmitted from the brake pedal to master piston, and the generated brake force and the brake force distribution between front and rear wheel brake units are not altered practically, regardless of the regular working conditions of the hydraulic braking systems A and B, of the disabled condition of either system A or B, or of the occasional and unintentional fluid communication between the both systems A and B.

The valve piston 113 of regulator valve unit C will act to regulate the hydraulic pressure to shift a differential amount of oil for allowing the both systems A and B to attain their respectively prescribed oil pressures, so far as the both systems are kept in their normal operational conditions. In the case of operational failure of either system A or B, the piston will perform its full-stroke movement towards the side of the disabled hydraulic system until it is brought into callision against the stop 119 or 112d. However, it should be mentioned that even with full stroke movement of the piston 113, the amount or length is substantially small in comparison with the ineffective stroke of the master piston as met in the case of operational failure of either of the hydraulic systems A and B. Therefore, the ineffective stroke of the brake pedal appearing in the last mentioned defective case will be suppressed to a certain possible minimum.

With the full stroke movement of the valve piston 113, the switching mechanism comprising the members 122, 122a, 123a and 123b will be caused to turn to on, for igniting the lamp 124. Thus, the driver becomes aware of the disabled condition of the hydraulic system A or B by accident.

In the case of the unintentional fluid communication between the both hydraulic systems A and B, the pressures prevailing in these both will become equal to each other, and thus, the valve piston 113 will be shifted, as above mentioned, until it collides against stop means 119 or 112d, as the case may be, so as to bring the related switching mechanism to turn on. Thus again, lamp 124 will be ignited and the driver will become aware of breakage of the seal at 106, 120 or 158, as the case may be.

What is claimed is:

1. In a dual hydraulic brake system for a vehicle having front and rear wheels with hydraulically operated brakes on each wheel, the improvements comprising: a master cylinder unit having a stepped bore, a stepped hydraulic piston slidable therein and defining two independent master chambers of mutually different effective cross-sectional areas, said piston being operatively connected to a brake pedal with each of said master chambers being capable of receiving all of the pressurizing effort transmitted from said pedal and piston in the event the other of said chambers is disabled; a liquid pressure regulator valve unit having a stepped cylinder, a stepped piston slidable therein, a first hydraulic chamber formed at the outer end of the larger piston part of said stepped piston and having a circular cross-section within the bore of said cylinder, a second hydraulic chamber formed at the inner end of the larger piston part, the smaller piston part passing through said second chamber so as to provide a ring-shaped cross-section thereof within the bore of said cylinder, a sealing member disposed between the larger piston and said cylinder for sealing off said two hydraulic chambers from each other and an alarm switching means operatively connected with said stepped piston; front and rear brake cylinder means on said front and rear wheels respectively, each having two normally independent hydraulic chambers, one of which has a larger effective cross-sectional area than the other, at least a pair of said chambers being separated by a single seal ring; a first piping means connecting the hydraulic chambers of said master cylinder, regulator valve unit and said brake cylinder means having the smaller effective cross-sectional area one after the other for providing a first independent hydraulic brake system; and a second piping means connecting the chambers of said master cylinder, said regulator valve units and said brake cylinder means having the larger effective cross-sectional areas one after another to provide a second independent hydraulic brake system; the relative ratio of the effective cross-sectional areas of the chambers of each of said master cylinder, said regulator valve unit and said front and rear brake cylinder means being a constant value other than unity so as to provide a hydraulic pressure difference between both of said systems, and wherein when the two normally independent hydraulic braking systems are brought into communication with each other by accidental breakage of a seal ring, such communication is sensed by said pressure regulator valve and said alarm switching means is actuated to provide an alarm.

* * * * *